United States Patent [19]

Cooper

[11] 4,159,410
[45] Jun. 26, 1979

[54] METHOD AND APPARATUS FOR APPLYING MOLTEN FILLER MATERIAL

[75] Inventor: Ernest B. Cooper, Cincinnati, Ohio

[73] Assignee: General Electric Company, Cincinnati, Ohio

[21] Appl. No.: 806,217

[22] Filed: Jun. 13, 1977

[51] Int. Cl.² .............................................. B23K 9/00
[52] U.S. Cl. .............................. 219/137.7; 219/121 P; 219/75
[58] Field of Search ................... 219/137, 130, 74, 75

[56] References Cited

U.S. PATENT DOCUMENTS

| | | | |
|---|---|---|---|
| 2,093,881 | 9/1937 | Conrad | 219/137 R |
| 2,505,054 | 4/1950 | McElrath et al. | 219/74 |
| 2,731,536 | 1/1956 | Laur | 219/137 R |

FOREIGN PATENT DOCUMENTS 627795 7/1963 Belgium ............................... 219/137 R

*Primary Examiner*—J. V. Truhe
*Assistant Examiner*—M. Paschall
*Attorney, Agent, or Firm*—Lee H. Sachs; Derek P. Lawrence

[57] ABSTRACT

A filler material such as in wire form is applied to the work surface of a workpiece through a method and apparatus which moves the wire in a reciprocating motion, alternatively to withdraw from and then reinsert the end of the wire into a molten weld pool generated such as from an electric arc between an electrode and the workpiece, a plasma arc or other heating torch means.

6 Claims, 3 Drawing Figures

U.S. Patent     Jun. 26, 1979     4,159,410
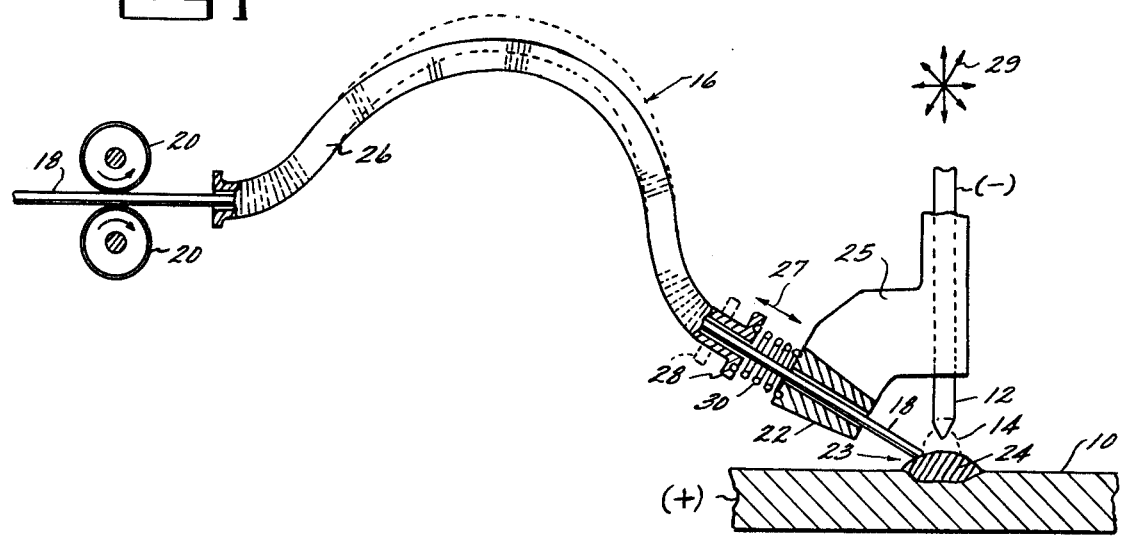
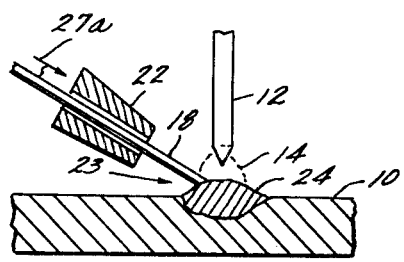 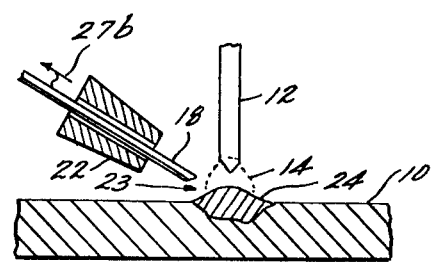

METHOD AND APPARATUS FOR APPLYING MOLTEN FILLER MATERIAL

FIELD OF THE INVENTION

This invention relates to welding and repair welding and, more particularly, to improved method and apparatus which provides a weld pool on the workpiece into which a filler material is fed for melting and application to the workpiece surface.

BACKGROUND OF THE INVENTION

In the semi-automatic welding and repair welding of such articles as gas turbine engine alloy components, it is a general practice to add filler material in the form of metal wire, ribbon, etc., which is fed mechanically into a molten weld puddle or pool. As used herein, the term "wire" is intended to include such other equivalent material forms. Such a pool can be provided as a result of an electric arc generated between an electrode and a work surface of the workpiece, a plasma arc or other such heating torch means. Relative motion is provided between such electrode and the work surface to enable the arc or torch to traverse that portion of the surface to be welded or repaired.

In many welding applications, the wire has been seen to melt prematurely before it can reach the region of the weld pool and arc, thus causing an accumulation, such as a drop or globule, to form on the end of the wire. This accumulation enlarges and, when it finally reaches the electric arc/weld pool region, results in uneven deposits of filler material. One suggested remedy has been to extend the feed nozzle through which the wire of filler material is fed to provide more chill to the wire. Other suggestions have included reducing the diameter of the wire, or increasing the feed, or sliding the wire along the work surface to provide more chill to the wire through such surface. Such methods have been found to be only partially successful, and undesirable.

SUMMARY OF THE INVENTION

It is a principal object of the present invention to provide an improved method for applying filler material to a workpiece in a more uniform, controlled manner. it It is another object of the present invention to provide apparatus which varies the application of filler material during and in respect to the relative traverse of an electrode in respect to a cooperating workpiece with which it is cooperating.

These and other objects and advantages will be more fully understood from the following detailed description, the examples and the drawing, all of which are intended to be typical of rather than in any way limiting on the scope of the present invention.

Briefly, one form of the method associated with the present invention for applying a filler material, such as a wire to a workpiece by melting an end of the wire in a heating torch means and depositing the melted material on the workpiece, comprises providing the wire with a feed rate into a heating/molten pool region which varies in a reciprocating manner alternatively to withdraw from and to insert into such region the end of the wire to melt the end of the wire intermittently. In a more specific form, the weld pool is generated from an electric arc between an electrode and the workpiece while providing relative surface transverse motion between the workpiece and the electrode, during which the filler material is melted and added to the molten pool. The wire of filler material is provided with a feed rate into the region of the electric arc and weld pool, which rate varies in a reciprocating manner alternatively to withdraw from and to insert into the weld pool and electric arc region the end of the wire during the relative surface traversing motion thereby melting the end of the wire intermittently.

The apparatus associated with the present invention, in one form, includes heating torch means, means to direct the heating torch means toward the workpiece, and filler wire feed means which varies the feed of the filler wire toward the workpiece at a net positive feed in a reciprocating manner. Included can be means to provide relative surface traversing motion between the heating torch means and a surface of the workpiece. In one specific form, such filler wire feed means includes feed drive rolls the direction of rotation of which are reversed from the forward feed direction in a manner in which the forward wire feed distance is always greater than the reverse direction. In another form, such feed means comprises a flexible feed wire guide conduit between constant forward rotating feed rolls, the flexible conduit being moved in a reciprocating manner, such as through the use of an eccentric controlled by a motor to provide reciprocating motion to the feed wire.

BRIEF DESCRIPTION OF THE DRAWING

FIG. 1 is a partially sectional, diagrammatic view of one form of the apparatus associated with the present invention;

FIGS. 2 and 3 are fragmentary diagrammatic views of alternate positions of the filler wire used in the present invention, within and out of the electric arc/molten weld pool region.

DESCRIPTION OF THE PREFERRED EMBODIMENTS

In order to avoid the undesirable, melted accumulation of filler wire material on the end introduced into a heating/weld pool region, one form of the method and apparatus associated with the present invention provides an intermittent thrusting or "dabbing" of the wire end into and out of such region. As the filler wire is removed from the region, it cools sufficiently to avoid premature melting and formation of a droplet on its end. Upon reinsertion into the region, which is adjacent or within the electric arc drawn between the electrode and the workpiece, the weld pool, or both, the filler wire again is melted and deposits filler material as desired. According to the present invention, the reciprocating, forward movement of the filler wire is repeated continuously at rates of many times per second, for example about 2–30 strokes or forward insertions into the weld puddle per second, to result in a uniform, reproducible deposition of filler material. The cooling of the wire can be accomplished by the atmosphere, the feed nozzle, or combinations of the two. If higher welding currents are used, the feed nozzle can be adapted to include a cooling means for further chill, for example through the use of a water-cooled jacket around the feed nozzle.

One embodiment of the apparatus associated with the present invention is shown in the partially sectional, diagrammatic view of FIG. 1. Workpiece 10 represents a variety of articles on which it is common practice in the welding art to use the combination of a welding electrode and a filler wire for such purposes as joining members together, build-up of worn surfaces, etc. In the gas turbine engine art, such members frequently are of a material based on such elements as Fe, Co, Ni and Ti. In the particular embodiment more widely evaluated in connection with the present invention, workpiece 10 represents, diagrammatically, a gas turbine engine labyrinth-type seal at least one tooth of which requires repair through the addition of material for build-up of the tooth area.

Cooperating with workpiece 10 in FIG. 1 is an electrode 12, generally of the non-consumable type, although consumable electrodes can be used as well. An electric arc 14 is drawn between electrode 12 and workpiece 10 through the use of welding current generators of the type commonly used in the art and represented in FIG. 1 by the negative (−) and the positive (+) signs. It should be understood that plasma-type apparatus can be used as a heating torch to provide the necessary heat.

A filler wire feed means or assembly, shown generally at 16 in FIG. 1, delivers a filler wire 18 from a wire source (not shown) through motor driven feed rolls 20 and feed nozzle 22 ultimately to weld pool 24 produced on workpiece 10 as a result of electric arc 14 generated between the workpiece 10 and electrode 12. Thus there is defined a heating/molten pool region, in this example an electric arc/weld pool region, shown generally at 23. As is familiar to those skilled in the art, workpiece 10 or the combination of feed nozzle 22 and electrode 12 can be moved or positioned relative one to the other in a variety of ways as indicated diagrammatically by arrows 29. For example, it is common practice to use a wire feed accessory manipulator clamped to apparatus which carries electrode 12, to provide a unit, sometimes referred to as a "heating torch means" or a "welding torch", represented by unit 25 in FIG. 1. Such an assembly generally includes means to position feed nozzle 22 in a variety of ways in respect to electrode 12.

One form of the apparatus associated with the present invention to enable practice of its method is disposed, in the embodiment shown in FIG. 1, between feed rolls 20 and feed nozzle 22. Such apparatus includes a flexible feed wire guide conduit 26 which carries filler wire 18 and which is disposed along an arcuate path between feed rolls 20 and feed nozzle 22. The reciprocating motion, represented by double-headed arrow 27 and provided to filler wire 18 as it is displaced generally forwardly toward weld pool 24, i.e., at a net positive feed, is accomplished by applying mechanical force at end 28 of conduit 26 which results in conduit 26 changing radius as shown in phantom in FIG. 1. Such displacement or change in radius, for example occurring at the rate of about 2-30 strokes per second, during operation of feed rolls 20 moves filler wire 18 into and out of electric arc/weld pool region 23.

The reciprocating movement of wire 18 can be accomplished in a variety of ways, for example through the use of a cable associated with an eccentric controlled by a motor operating against a biasing means such as spring 30 to produce reciprocating motion 27. Change in the curvature of the arc or friction between flexible conduit 26 and filler wire 18, or both, are believed to provide reciprocal motion 27 to filler wire 18. However, it should be understood that a variety of means can be used to bring about such reciprocating or pulsing movement to filler wire 18 superimposed upon its forward movement toward weld pool 24. For example feed rolls 20 can be periodically reversed in their normal forward direction which is shown by their direction movement arrows in FIG. 1, with the reverse movement being somewhat less than the forward movement. This provides a reciprocating, varying feed rate to filler wire 18 in a manner which displaces the filler wire forward toward the electric arc/weld pool region while at the same time providing it with such reciprocating motion. In another embodiment, such pulsing can be accomplished by a stepping motor with reverse and forward motion, the forward motion being selected to be greater than the reverse motion to "dab" the filler wire into such region.

The apparatus is provided with relative surface traversing motion as indicated diagrammatically by arrows 29. Such motion can be provided by movement of the workpiece, the heating means, or both.

As was indicated before, the constant, direct feed of a filler wire, such as 18, into an electric arc/weld pool region can result in over-heating of the wire and premature melting despite the proximity of the weld wire to a feed nozzle such as 22. According to the present invention, such premature melting and accompanying accumulation of droplets on the wire are avoided by reciprocating or pulsing the movement of filler wire 18, as it is fed into the electric arc/weld pool region between the positions shown in FIGS. 2 and 3. In FIG. 2, arrow 27a represents the forward motion; in FIG. 3, arrow 27b represents the smaller reverse motion.

Through practice of the present invention, it has been found that the angle of entry of filler wire 18 into the weld pool can be increased from the normal 15° angle to as high as 90° without causing accumulation or droplet problems. Using the prior art methods and apparatus, it has been recognized that at entry angles of between about 15 and 20°, globules begin to form on the end of the wire. In addition, because the apparatus of the present invention can be adapted to move the welding electrode and the filler wire feed nozzle in a variety of directions and positions, wider gaps between members to be processed can be filled. Also, the present invention enables more accurate quality control of the weld pool and the resultant weld build-up through the pulse synchronization of the present invention. Further, operations such as braze welding can be accomplished using high electric current close to the workpiece. In such a case, it is generally desirable to water cool feed nozzle 22, such as through the use of a water jacket.

In the evaluation of the present invention, reciprocating motion of the filler wire has been evaluated at least up to about 30 strokes per second. Above that rate, vibrations tend to increase to an unsatisfactory level. Below about 2 strokes per second, instability tends to increase. Therefore, it has been found that about 5-15 strokes per second and generally about 8-10 strokes per second are sufficient. Through practice of the present invention, successful butt welds have been made at the rate of up to about 40 inches per minute without undercut.

In one specific example, a gas turbine engine knife edge seal of about 0.03" thick of a titanium alloy comprising nominally, by weight, about 6% Al, 4% V with the balance Ti, sometimes referred to as Ti-6-4 alloy, was repaired using the present invention. Although filler wire of that same titanium-base alloy and having a diameter of about 0.03" normally is used in such a repair operation, through practice of the present invention, a larger, less expensive wire, in this example 0.045" Ti-6-4 alloy was used and easily controlled in the gas tungsten arc welding method well known in the art, using a thoriated tungsten non-consumable electrode. Although the positive wire feed rate has been evaluated in the range of from about 2 inches per minute to about 25 inches per minute, this example used a positive feed rate of about 3-4 inches per minute with a reciprocating stroke rate of about 8 strokes per second. Weld additions as high as about 0.15" have been accomplished in about 7 passes of the combination electrode/filler wire feed system over the workpiece surface. Through coordination of the feed wire movement and the movement of the electrode, a weld pool can be created prior to introduction of the filler material, in the sequential movement of the combination over the surface of a workpiece.

Other articles such as gas turbine engine seals made of commercially available nickel-base superalloys, for example Inco 718 alloy, have been repaired in a similar manner using nickel-based filler wire. This is representative of the repair of typical gas turbine engine articles made of alloys based on Fe, Co or Ni using compatible filler wire, as with the Ti-base alloy articles above.

Thus, the present invention provides significant advantages over prior methods and apparatus. For example, filler wire or ribbon addition is more uniform. Also, deeper penetration with narrower welds results because the welding arc can be used to first melt the workpiece metal without the intervening effect of the filler. Then, after proper heating of the base metal, filler material can be added to achieve reinforcement. The result of practice of the method of the present invention results in less shrinkage, lower distortion, higher welding speeds and more uniform welds. A further advantage is that the filler wire can be fed vertically or at very steep angles, thus permitting better access and welding in any direction without the necessity of swivelling the feed nozzle in the direction of the seam being produced. As was indicated before, larger diameter, less expensive filler wire can be used. Because the present invention provides increased control of penetration and fusion, semi-automatic welding of joints can be accomplished with variable gaps.

By modifying such variables as filler wire stroke length, forward dwell time, retract dwell time, transit velocity and nozzle proximity to the tip of the wire in the various positions, melting of the filler wire can be varied over a range from solid to near liquid when the tip of the filler wire enters the weld pool. Through similar controls, it is possible according to the present invention to braze weld by melting filler of a lower melting point without melting the base metal and still achieving a sound bond. As will be appreciated by those skilled in the art, the reciprocating, "dabbing" function of the present invention can be used with both cold and hot wire feed systems and with such methods as the gas tungsten arc and plasma welding processes. If further control is desired, melting of the wire can be controlled by synchronizing the weld current level to the filler wire position. By pulsing the current upward while the wire is retracted, less heating of the wire will occur. Since the variables can be adjusted such that the filler wire can enter the weld pool at a lower current level, heat from the pool itself will provide the energy to melt the filler wire and in so doing will help solidify and control the weld pool temperature, shape and fluidity. Thus, although the present invention has been described in connection with specific examples and embodiments, it will be recognized by those skilled in the art the wide variety of variations and modifications of which the present invention is capable without varying from its scope. It is intended to include within the scope of the appended claims such variations and modifications.

What is claimed is:

1. In a method for applying filler material to a workpiece in which an end of a filler wire of the filler material is melted in a heating torch means to provide a heating/molten pool region and the melted filler material is deposited on the workpiece, the improvement comprising:
    feeding the filler wire through a cooling member into the heating/molten pool region in a reciprocating manner at a rate of 2-30 strokes per second, alternatively to withdraw from and to insert into said region the end of the wire, the end, when withdrawn, being cooled by the cooling member thereby melting the end of the wire intermittently.

2. The method of claim 1 in which the heating torch means includes an electrode which generates an electric arc for the provision of heat and the cooling member is associated with a wire feed nozzle to cool the feed nozzle, the additional steps of:
    providing relative surface traversing motion between the heating torch means and the workpiece; while,
    feeding the filler wire through the cooled feed nozzle and into the heating/molten pool region in the reciprocating manner during the traversing motion.

3. The method of claim 2 in which:
    the filler wire is of a material based on an element selected from the group consisting of Fe, Co, Ni and Ti;
    the electric arc is generated between a non-consumable electrode and the workpiece to provide an electric arc/molten pool region; and
    the filler wire is reciprocated into and from said region at the rate of 5-15 strokes per second.

4. Apparatus for applying filler material to a workpiece, the apparatus including heating torch means, means to direct the heating torch means toward a surface of the workpiece to provide a heating/molten pool region, and filler wire feed means to feed an end of the filler wire toward said region, the improvement comprising:
    providing the filler wire feed means with a wire cooling member through which the end of the filler wire is fed and with feed varying means which reciprocates movement of the filler wire at a rate of 2-30 strokes per second alternatively to withdraw from and insert into said region the end of the wire while maintaining a net positive feed, the cooling member being positioned with respect to the end of the wire such that, when withdrawn, the end of the wire is cooled by the cooling member thereby to melt the end of the wire intermittently.

5. The apparatus of claim 4 in which the filler wire feed means includes wire feed rolls, means to rotate the feed rolls alternatively in the forward feed and in the reverse feed directions, the forward feed being greater than the reverse feed to provide a net positive feed to feed the end of the filler wire toward the heating/molten pool region, and a fluid-cooled wire feed nozzle to direct the filler wire toward said region.

6. The apparatus of claim 5 including, in addition, means to provide relative surface traversing motion between the heating torch means and the workpiece surface to move the heating/molten pool region along said surface.

* * * * *